United States Patent [19]
Behr et al.

[11] Patent Number: 5,756,624
[45] Date of Patent: May 26, 1998

US005756624A

[54] TERPENE COPOLYMERS

[75] Inventors: Arno Behr, Duesseldorf; Wolfgang Ritter, Haan; Hans-Peter Handwerk, Duesseldorf; Oliver Pietsch, Muelheim, all of Germany

[73] Assignee: Henkel Kommanditgesellschaft auf Aktien, Duesseldorf, Germany

[21] Appl. No.: 722,099

[22] PCT Filed: Mar. 25, 1995

[86] PCT No.: PCT/EP95/01133

§ 371 Date: Nov. 4, 1996

§ 102(e) Date: Nov. 4, 1996

[87] PCT Pub. No.: WO95/26992

PCT Pub. Date: Oct. 12, 1995

[30] Foreign Application Priority Data

Apr. 2, 1994 [DE] Germany ............ 44 11 556.3

[51] Int. Cl.⁶ ............................................ C08F 232/08
[52] U.S. Cl. ............ 526/309; 526/271; 526/272; 526/280; 526/281; 526/284; 526/317.1; 526/318.3; 526/319; 526/336; 526/338
[58] Field of Search ............................ 526/272, 308, 526/309, 271, 284, 338

[56] References Cited

U.S. PATENT DOCUMENTS

| | | | |
|---|---|---|---|
| 4,325,770 | 4/1982 | Korpman | 156/230 |
| 4,421,737 | 12/1983 | Ito | 424/28 |
| 4,670,504 | 6/1987 | Cardenas | 524/504 |
| 5,514,435 | 5/1996 | Suzuki | 428/40 |

*Primary Examiner*—Fred Zitomer
*Attorney, Agent, or Firm*—Wayne C. Jaeschke; John Daniel Wood; Henry E. Millson, Jr.

[57] ABSTRACT

A method of tackifying an adhesive is provided, the improvement comprising the use of a copolymer consisting of monomer units derived monomers consisting of:

(A) 10 to 50% by weight of a terpene with no conjugated double bonds, (B) 20 to 50% by weight of a member selected from the group consisting of olefinically unsaturated monocarboxylic acids containing 3 to 5 carbon atoms and anhydrides thereof, and olefinically unsaturated dicarboxylic acids containing 3 to 5 carbon atoms and anhydrides thereof, and (C) 40 to 50% by weight of an ester selected from the group consisting of esters and semiesters of olefinically unsaturated monocarboxylic containing 3 to 5 carbon atoms and esters and semiesters of olefinically unsaturated dicarboxylic acids containing 3 to 5 carbon atoms, with the proviso that the sum total of said monomers is 100% by weight.

11 Claims, No Drawings

TERPENE COPOLYMERS

FIELD OF THE INVENTION

This invention relates to terpene copolymers, to their production by radical polymerization and to their use.

PRIOR ART

Normally, terpenes are cationically homopolymerized and copolymerized. Typical catalysts for these polymerizations are aluminium trichloride, aluminium trichloride/antimony trichloride mixtures, ethyl aluminium dichloride/water mixtures, kaolinite or solid super acids.

Unfortunately, cationic polymerizations have the major disadvantage that they have to be carried out at low temperatures, generally with cooling. On an industrial scale, this procedure is extremely complicated and expensive.

Radical homopolymerizations and copolymerizations with terpenes have also been described, cf. *Eur. Polym. J.*, 24 (5), 453–6, 1988.

These reactions are carried out solely as solution polymerizations, for example in tetrahydrofuran, benzene, dioxane or toluene. These partly toxic and carcinogenic solvents then have to be removed with considerable effort. Bulk polymerization is not described. It is even specifically pointed out (Eur. Polym. J., 24(5), 453–6, 1988) that solventless polymerization is undesirably accompanied by explosions and leads to insoluble and hence unusable polymers. Although there are references to bulk copolymerization, they relate to the monomers which readily lend themselves to radical homopolymerization.

The problem addressed by the present invention was to provide a process which would not have any of the above-mentioned disadvantages of cationic polymerization and radical solution polymerization and which would lead to useful products.

SUMMARY OF THE INVENTION

The solution provided by the invention consists in the provision of polymers containing monomer units of A) terpenes without a conjugated double bond,
B) olefinically unsaturated mono-and/or dicarboxylic acids containing 3 to 5 carbon atoms or anhydrides thereof,
C) optionally other vinyl monomers.

DETAILED DESCRIPTION OF THE INVENTION

The terpenes used include, for example, α-pinene, β-pinene, terpinolene, limonene (dipentene), β-terpinene, γ-terpinene, α-thujene, sabinene, δ-$^3$-carene, camphene, β-cadinene, β-caryophyllene, cedrene, α-bisalbone, β-bisalbone, γ-bisalbone, zingiberene, humulene, (α-caryophyl-1-ene), α-citronellol, linalool, geraniol, nerol, ipsenol, α-terpineol, D-terpineol-(4), dihydrocarveol, nerolidol, farnesol, α-eudesmol, β-eudesmol, citral, D-citronellal, carvone, D-pulegone, piperitone, carvenone, bisabolene, β-selinene, α-santalene, vitamin A, abietic acid and mixtures of these compounds.

Terpenes with internal double bonds are preferred, α-pinene, geraniol, nerol, citral and citronellal being particularly preferred. Of the terpenes containing an internal double bond, limonene/dipentene, β-pinene, camphene and linalool are mentioned in particular.

The comonomer B) is selected from olefinically unsaturated mono-and/or dicarboxylic acids containing 3 to 5 carbon atoms or anhydrides thereof. Specific examples are maleic anhydride, maleic acid, fumaric acid, acrylic acid, methacrylic acid, itaconic acid and crotonic acid. Carboxylic acids containing a C—C double bond and derivatives thereof are preferably used, maleic acid and its derivatives being particularly preferred.

The comonomer C) is selected from vinyl monomers, for example styrene, vinyl chloride, vinylidene chloride, vinyl acetate, vinyl ether, acrolein and acrylonitrile.

Preferred comonomers C) are esters and/or semiesters of olefinically unsaturated monocarboxylic and/or dicarboxylic acids containing 3 to 5 carbon atoms, for example acrylates, methacrylates, maleic acid semiesters and diesters, fumaric acid semiesters and diesters, itaconic acid esters and crotonic acid esters. Mixtures of these compounds may also be used.

The alcohol radicals of the esters mentioned may be both short-chained (methyl, ethyl etc.) and long-chained ($C_{12}$, $C_{16}$, $C_{18}$ fatty esters).

Esters of long-chain alcohols containing 6 to 22 carbon atoms are preferably used.

The quantities of monomer units A), B) and C) in the copolymer are as follows:

10 to 95 and preferably 10 to 50% by weight of monomer units A), 5 to 90 and preferably 20 to 50% by weight of monomer units B) and 0 to 60 and preferably 40 to 50% by weight of monomer units C), the sum total of A)+B)+C) being 100% by weight.

The polymerization reaction is a radical polymerization preferably carried out in the absence of a solvent, i.e. in bulk. Solvents in the present context are understood to be organic liquids which are capable of dissolving the terpene copolymer or the comonomers or monomers at room temperature.

Azo compounds, and, above all, organic peroxides are used as radical initiators. Specific classes of radical initiators and compounds include diacyl peroxides, for example dibenzoyl peroxide and lauryl peroxide, peroxy-carbonates, for example di-n-butyl peroxydicarbonate, alkyl peresters, for example butyl perbenzoate and tert.butyl per-2-ethylhexanoate, dialkyl peroxides, for example di-t-butyl peroxide, alkyl hydroperoxides, for example cumene hydroperoxide and t-butyl hydroperoxide, azo compounds, for example azo-bis-(isobutyronitrile) and azo-bis-(ethylisobutyrate) and mixtures of these compounds. t-Butyl perbenzoate is preferably used. The polymerization process may be carried out, for example, by any of the following variants:

a) The terpene(s) and optionally part of the comonomer(s) are initially introduced into the reaction vessel and the comonomer(s) and the remainder of the comonomer(s) and the radical initiator(s) are subsequently added.

b) The comonomer(s) is/are initially introduced and the terpene(s) and the radical initiator(s) are subsequently added.

c) The terpene(s) and the comonomer(s) are introduced together and the radical initiator(s) is/are subsequently added.

Variant a) is preferred, the comonomer being added with the initiator to the terpene at a rate commensurate with that at which the terpene dissolves in the copolymer.

The reaction time (=addition time) is between 1 and 10 hours and preferably between 4 and 6 hours. An after-reaction may optionally be carried out for 1 to 20 hours.

The reaction temperature is in the range from 100° to 200° C., preferably in the range from 120° to 170° C. and more preferably in the range from 140° to 160° C.

In its most simple form, the reaction vessel is a glass flask equipped with a reflux vessel and a dropping funnel. Depending on the monomer used, the reaction may have to be carried out in a pressure autoclave.

The concentrations of terpenes, comonomers and radical initiator may be varied within wide limits. The concentration of initiator is preferably in the range from 1 to 10% by weight and more preferably in the range from 2 to 5% by weight.

Since the terpene is almost completely reacted during the polymerization, the copolymers according to the invention are distinguished by the fact that, immediately after the copolymerization, they contain less than 20% by weight and, in particular, less than 10% by weight of unreacted terpene. The content of unreacted terpene is determined by gas chromatography.

The copolymers produced in accordance with the invention may be used as tackifiers in adhesives, in paints and as binders for printing inks, textile sizing agents, builders and hardeners. Copolymers with esters to which a relatively long-chain alcohol radical is attached are suitable for hydrophobicization, for example for hydrophobicizing shoe and clothing leather.

EXAMPLES

Example 1

136 g (=1.0 mole) of α-pinene and 19.6 g (=0.2 mole) of maleic anhydride are introduced into a reaction flask (equipped with a stirrer, reflux condenser and two dropping funnels). The contents of the flask are heated to 150° C. and another 78.4 g (=0.8 mole) of maleic anhydride and 11.7 g of tert.butyl perbenzoate (TBPB) are simultaneously added dropwise with stirring over a period of 4 hours. Under the effect of the exothermic reaction, an internal temperature of 168° C. is established. The heat generated is dissipated by vapor cooling of the α-pinene. After a reaction time of only about 30 minutes, copolymerization can be observed. After 4 hours, the flask contains a highly viscous copolymer which contains only small quantities of unreacted α-pinene. The reaction mixture is then after-reacted for another 2 hours. The product is red-yellow in color and soluble in acetone and in tetrahydrofuran. Analysis by gel permeation chromatography (GPC) with polystyrene as standard reveals a residual α-pinene content of 12.5% and a unimodal copolymer with average molecular weights of 600 (number average) and 1400 (weight average). The solid product has a sintering range of 172° to 180° C. and a melting point of 192° C. (as determined on a Kofler bench).

Example 2

Example 1 was repeated with a larger reaction mixture. In all, 612 g (=4.5 moles) of α-pinene and 441 g (=4.5 moles) of maleic anhydride were reacted with 52.6 g of tert.butyl perbenzoate as radical initiator. According to GPC, the product has molecular weights of 600 (number average) and 1100 (weight average). The residual monomer content is 7%. The residual monomer content can be reduced to 3% by applying vacuum (12 mbar) and heating to 200° C. The sintering and melting points are identical with Example 1.

Example 3

The procedure was as described in Example 1, except that a smaller quantity of maleic anhydride was used: 136 g (=1.0 mole) of α-pinene are reacted with 49 g (=0.5 mole) of maleic anhydride. After a total reaction time of 6 hours, 73.4 g of unreacted α-pinene are left. 112 g of copolymer with an α-pinene/maleic anhydride ratio of 1:1.09 are formed. According to GPC, the product has molecular weights of 600 (number average) and 1500 (weight average). The sintering range is 140° to 155° C. and the melting point 190° C.

Example 4

The procedure was as described in Example 1, except that a larger quantity of maleic anhydride was used: 136 g (=1.0 mole) of α-pinene are reacted with 147 g (=1.5 mole) of maleic anhydride. After a total reaction time of 6 hours, a hard brittle copolymer has formed. According to GPC, the product has molecular weights of 650 (number average) and 1400 (weight average). The sintering range is 150° to 160° C. and the melting point 180° C.

Example 5

The procedure was as described in Example 1, except that the reaction times were different. 136 g (=1.0 mole) of α-pinene are reacted with 49 g (=0.5 mole) of maleic anhydride. The dropwise addition time was increased to 7 hours and the after-reaction time to 16 hours. 66.5 g of α-pinene do not react off and are recovered after the reaction. 118 g of copolymer with a ratio of α-pinene to maleic anhydride of 1:0.98 are formed. The molecular weights are 650 (number average) and 1200 (weight average). The sintering range is 140° to 150° C. and the melting point 180° C.

Example 6

The procedure was as described in Example 1, except that β-pinene is used as the terpene compound. A fragile solid product with molecular weights of 1000 (number average) and 3800 (weight average) is formed in the 1:1 copolymerization with maleic anhydride. Its sintering range is 140° to 150° C. and its melting point 190° C.

Example 7

The procedure was as described in Example 6, except that the ratio of β-pinene to maleic anhydride was 1:1.5. A copolymer with molecular weights of 950 (number average) and 3300 (weight average) is formed. Its sintering range is 140° to 160° C. and its melting point 170° C.

Example 8

The procedure was as described in Example 1, except that myrcene was used as the terpene compound. A copolymer with molecular weights of 850 (number average) and 9300 (weight average) is formed.

Example 9

This Example corresponds to Example 8 except that a different procedure was tried. 136 g (=1.0 mole) of myrcene and 98 g (=1.0 mole) of maleic anhydride were initially introduced and heated to 160° C., after which the radical initiator tert.butyl perbenzoate (11.8 g) was added dropwise over a period of 4 hours, followed by after-reaction for 2 hours. A copolymer with molecular weights of 600 (number average) and 2300 (weight average) is formed. It has a sintering range of 40° to 50° C. and a melting point of 80° C.

Example 10

This Example corresponds to Example 8 except that another procedure was tried. 98 g (=1.0 mole) of maleic anhydride were initially introduced at around 160° C. and a mixture of 136 g (=1.0 mole) of myrcene and 11.8 g of tert.butyl perbenzoate was added dropwise. The copolymer has molecular weights of 600 (number average) and 2600 (weight average). It sintering range is 30° to 50° C. and its melting point around 60° C.

Example 11

The procedure was as described in Example 1, except that acrylic acid was used as the comonomer. 136 g (=1.0 mole) and 72 g (=1.0 mole) of acrylic acid were reacted at 140° C. with the radical initiator tert.butyl per-2-ethylhexanoate. 50.2 g of unreacted α-pinene are left after the reaction. The molar ratio of α-pinene to acrylic acid in the copolymer is 1:1.6. The copolymer has molecular weights of 800 (number average) and 3400 (weight average). Its sintering range is 120° to 130° C. and its melting point 180° C.

Example 12

The procedure was as described in Example 11, except that a larger quantity of α-pinene was used: 272 g (=2.0 moles) of α-pinene were reacted with 72 g (=1.0 mole) of acrylic acid. After the reaction time of 4 hours (plus 2 hours' after-reaction) at 140° C., 205 g of α-pinene remained unreacted. the molar ratio of α-pinene to acrylic acid in the copolymer is 1:2.0. The copolymer has molecular weights of 1000 (number average) and 3000 (weight average). Its sintering range is 120° to 130° C. and its melting range 150° to 160° C.

Example 13

The procedure was as described in Example 11, except that 5% by weight of tert.butyl perbenzoate was used as the initiator. A copolymer with molecular weights of 950 (number average) and 3800 (weight average) is formed. It has a sintering range of 120° to 130° C. and a melting point of 150° to 160° C.

Example 14

The procedure was as described in Example 11, except that the reaction temperature was reduced to 130° C. After the reaction, 116 g of α-pinene remain unreacted. The copolymer has molecular weights of 850 (number average) and 2500 (weight average). Its sintering range is 120° to 130° C. and its melting point 150° C.

Example 15

The procedure was as described in Example 1, except that limonene was used as the terpene compound. A copolymer with molecular weights of 750 (number average) and 2300 (weight average) is formed.

Example 16

The procedure was as described in Example 1, except that methacrylic acid was used as the comonomer (86.1 g=1.0 mole). 38.7 g of α-pinene remain unreacted. The molar ratio of α-pinene to methacrylic acid in the copolymer is 1:1.4. The copolymer has molecular weights of 750 (number average) and 2000 (weight average). The sintering range is 130° to 150° C. and the melting point 170° C.

Example 17

The procedure was as described in Example 1, except that methyl methacrylate was used as the comonomer: 136 g (=1.0 mole) of α-pinene are reacted with 100 g (=1.0 mole) of methyl methacrylate. 11.8 g of tert.butyl per-2-ethylhexanoate are used as the radical initiator. After a reaction time of 4 hours and an after-reaction time of 2 hours at 125° C., 87 g of methyl methacrylate remain unreacted. The molar ratio of α-pinene to methyl methacrylate in the copolymer is 1:2.8. The copolymer has molecular weights of 700 (number average) and 2400 (weight average). Its melting range is 60° to 70° C.

Example 18

The procedure was as described in Example 1, except that Lorol $C_{8-18}$ acrylate (256 g=1.0 mole) was used as the comonomer. A polymeric liquid is formed. GPC reveals a residual monomer content of 24%. The molecular weights are 700 (number average) and 2800 (weight average).

Example 19

The procedure was as described in Example 1, except that Lorol $C_{18}$ methacrylate (340 g=1.0 mole) was used as the comonomer. A polymeric viscous liquid is formed. GPC reveals a residual monomer content of 19%. The molecular weights are 700 (number average) and 2000 (weight average).

Example 20

260.55 g of $C_{16-18}$ fatty crotonate, 52.1 g of α-pinene and 83.3. g of maleic anhydride are introduced into a reaction flask (equipped with a stirrer, reflux condenser and three dropping funnels). The contents of the flask are heated to around 160° C. and the following substances are simultaneously added dropwise from the three dropping funnels over a period of 4 hours:

a mixture of 260.6 g of $C_{16/18}$ fatty crotonate (FC) and 52.1 g of pinene 333.0 g of maleic anhydride (MAH)

52.1 g of TBPB as initiator (=5% by weight).

This variant corresponds to an end monomer composition of 50% FC, 40% MAH and 10% pinene.

An after-reaction is then carried out for 2 h at 158° C. After cooling, part of the reaction mixture is removed as polymeric original substance and analyzed. The rest is converted by addition of water and sodium hydroxide into an aqueous dispersion with a pH value of 7.1 and a solids content of 26.3%.

Analysis of the polymer reveals residue monomer contents of 30.9% fatty crotonate, 11.2% MAH and 0% pinene. The average molecular weights, as determined by gel permeation chromatography, are 600 (number average) and 1700 (weight average).

Example 21

This Example corresponds to Example 20, except that the composition of the monomer is different. The monomer distribution is 50% by weight $C_{16/18}$ fatty crotonate, 30% by weight MAH and 20% by weight pinene. After dropwise addition for 4 hours and an after-reaction time of 2 hours at 158° to 164° C., a homogeneous melt readily soluble in acetone is obtained. The polymer has a melting range of 140° to 150° C. GPC analysis reveals a unimodal distribution with average molecular weights of 700 (number average) and 1600 (weight average).

Example 22

This Example corresponds to Example 20, except that the monomer distribution is 67.5% by weight $C_{16/18}$ fatty crotonate, 25.5% by weight MAH and 7.0% by weight pinene. After cooling, the product is homogeneous and highly viscous at room temperature and has a melting range of around 100° C. GPC analysis reveals a number average molecular weight of 750 and a weight average molecular weight of 1750.

Example 23

This Example corresponds to Example 20, except that the monomer distribution is 24% by weight $C_{16/18}$ fatty crotonate, 36% by weight MAH and 40% by weight pinene. The terpolymer has a sintering range of around 130° C. GPC analysis reveals a number average molecular weight of 600 and a weight average molecular weight of 1050.

Example 24

This Example corresponds to Example 20 with the same monomer distribution of 50% by weight FC, 40% by weight MAH and 10% by weight pinene. The semi-batch dropwise addition method was modified: 521.1 g of FC, 104.2 g of pinene and 83.3 g of MAH were introduced into the flask. The remaining molten MAH (333.0 g) and the initiator TBPB (52.1 g) were added dropwise from two dropping funnels. A terpolymer with a residual monomer content of 37.8% by weight fatty crotonate, 14.1% by weight MAH and 0.05% by weight of pinene is formed. Analysis by GPC reveals a number average molecular weight of 550 and a weight average molecular weight of 1150.

Example 25

This Example corresponds to Examples 20 and 24. However, the semi-batch dropwise addition method is again modified: 521.1 g of FC and 83.4 g of MAH were initially introduced into the reaction flask and 104.2 g of pinene, 333 g of MAH and TBPB as initiator (52.1 g) were added dropwise from three dropping funnels. A terpolymer with residual monomer contents of 34.9% by weight of FC, 14.2% by weight of MAH and 0.8% by weight of pinene is formed. Analysis by GPC reveals a number average molecular weight of 500 and a weight average molecular weight of 1200.

Example 26

The procedure was as described in Example 25 except that the temperature profile was modified. The reaction was started at 130° C., the reaction mixture was heated to 140° C. over a period of 30 minutes and, after pinene and MAH had been added, the temperature was increased to 156°–160° C. for 2 hours (after-reaction). A terpolymer with residual contents of 23.6% by weight of FC, 12.6% by weight of MAH and 0.7% by weight of pinene is formed. Analysis by GPC reveals a number average molecular weight of 700 and a weight average molecular weight of 2050.

Example 27

This Example describes the terpolymerization of pinene, maleic anhydride and $C_{16/18}$ fatty acrylate. 104.2 g of pinene, 104.2 g of $C_{16/18}$ fatty acrylate and 83.3 g of MAH are introduced into and heated to 148° C. in a reaction flask corresponding to Example 20. Another 416.9 g of $C_{16/18}$ fatty acrylate, 333.0 g of MAH and 52.1 g of TBPB as initiator were added dropwise over a period of 4 h from three dropping funnels. This was followed by an after-reaction for 2 h at 146° to 151° C. The reaction mixture corresponds to an overall composition of the terpolymer of 50% by weight of fatty acrylate, 40% by weight of MAH and 10% by weight of pinene. A terpolymer with residual monomer contents of 3.8% by weight of fatty acrylate, 2.4% by weight of MAH and 0.1% by weight of pinene is formed. Analysis by GPC reveals a number average molecular weight of 1200 and a weight average molecular weight of 4700. The product was converted into a dispersion with a solids content of 36.1% and a pH of 7.2 by neutralization with aqueous sodium hydroxide solution, i.e. without the addition of emulsifiers.

Example 28

This Example corresponds to Example 27, except that the overall composition was modified to 40% by weight of fatty acrylate, 40% by weight of MAH and 20% by weight of pinene. The terpolymer formed still contains 2.4% by weight of fatty acrylate, 1.3% by weight of MAH and 0.1% by weight of pinene. Analysis by GPC reveals a number average molecular weight of 1000 and a weight average molecular weight of 2900.

Example 29

This Example corresponds to Examples 27 and 28, except that the overall composition was modified to 30% by weight of fatty acrylate, 40% by weight of MAH and 30% by weight of pinene. The terpolymer formed still contains 1.5% by weight of fatty acrylate and 0.8% by weight of pinene. MAH can no longer be detected by analysis. Analysis by GPC reveals a number average molecular weight of 900 and a weight average molecular weight of 2100. An aqueous dispersion of this product (solids content 37.8%, pH value 7.1) remains stable.

Example 30

This Example describes the terpolymerization of pinene, maleic anhydride and $C_{16/18}$ fatty methacrylate. 77.6 g of fatty methacrylate, 77.6 g of MAH and 194.0 g of pinene are introduced into and heated to 153° C. in a reaction flask corresponding to Example 20. Another 310.4 g of fatty methacrylate, another 310.4 g of MAH and 45.8 g of TBPB as initiator were simultaneously added dropwise from three dropping funnels over a period of 4 h, followed by an after-reaction for 2 h at 156° to 160° C. The reaction mixture corresponds to an overall composition of 40% by weight of fatty methacrylate, 40% by weight of MAH and 20% by weight of pinene. A terpolymer with residual monomer contents of 0.2% by weight of fatty methacrylate and 1.1% by weight of MAH is formed. Pinene residues cannot be detected by analysis. Analysis by GPC reveals a number average molecular weight of 1000 and a weight average molecular weight of 7200. The product can be dispersed by addition of aqueous NaOH.

Example 31

This Example describes the terpolymerization of limonene, $C_{16/18}$ fatty crotonate and maleic anhydride. 550 g of fatty crotonate and 88 g of MAH are initially introduced and another 352 g of MAH, 110 g of limonene and TBPB (55 g) as initiator are added dropwise from three dropping funnels over a period of 4 h at 160° C. (after-reaction time: 2 h). This reaction mixture corresponds to an overall composition of 50% by weight of fatty crotonate, 40% by weight of MAH and 10% by weight of limonene. A terpolymer with residual contents of 16.7 g of fatty crotonate and 4% by weight of MAH is formed. Residual limonene cannot be detected. Analysis by GPC reveals a number average molecular weight of 700 and a weight average molecular weight of 2100.

Example 32

This Example describes the terpolymerization of $C_{16/18}$ fatty acrylate, acrylic acid and pinene. The polymerization was carried out as solution polymerization in xylene. 10 g of pinene, 40 g of acrylic acid, 50 g of fatty acrylate and 100 g of xylene are introduced into a reactor equipped with a reflux condenser and two dropping funnels. The remaining monomers (90 g pinene, 360 g acrylic acid and 450 g fatty acrylate in 900 g xylene) are added dropwise from one dropping funnel while the initiator TBPB (50 g) is added dropwise from the second dropping funnel. The addition time is 4 h at 135° to 138° C. and is followed by an after-reaction for 2 h at 134° C. The reaction mixture corresponds to an overall composition of 50% by weight of fatty acrylates, 40% by weight of acrylic acid and 10% by weight of pinene. A terpolymer with residual monomer contents of 2.5% by weight of fatty acrylate, less than 0.02% by weight of acrylic acid and 0.09% by weight of pinene is formed. Analysis by GPC reveals a unimodal distribution with a number average molecular weight of 2700 and a weight average molecular weight of 9600. The terpolymer can be converted into a stable dispersion by addition of aqueous sodium hydroxide.

What is claimed is:

1. In a method of tackifying an adhesive, the improvement comprising adding to the adhesive a tackifying quantity of a copolymer consisting of the following monomer units:
   (A) 10 to 50% by weight of a terpene with no conjugated double bonds,
   (B) 20 to 50% by weight of a member selected from the group consisting of olefinically unsaturated monocarboxylic acids containing 3 to 5 carbon atoms and anhydrides thereof, and olefinically unsaturated dicarboxylic acids containing 3 to 5 carbon atoms and anhydrides thereof, and
   (C) 40 to 50% by weight of an ester selected from the group consisting of esters and semiesters of olefinically unsaturated monocarboxylic acids containing 3 to 5 carbon atoms and esters and semiesters of olefinically unsaturated dicarboxylic acids containing 3 to 5 carbon atoms.

2. The method claimed in claim 1 wherein said terpene has an internal double bond.

3. The method claimed in claim 1 wherein said member of (B) is selected from the group consisting of acrylic acid, methacrylic acid, maleic acid and maleic anhydride.

4. The method claimed in claim 1 said ester of (C) is selected from the group consisting of acrylates, methacrylates, maleic acid semiesters and diesters, fumaric acid semiesters and diesters, itaconic acid esters and crotonic acid esters.

5. The method claimed in claim 4 wherein said esters are esters of alcohols containing 6 to 22 carbon atoms.

6. The method claimed in claim 1 wherein said member of (B) is selected from the group consisting of maleic acid and maleic anhydride.

7. The method claimed in claim 1 wherein said terpene is selected from the group consisting of α-pinene, geraniol, nerol, citral, citronellal, limonene/dipentene, β-pinene, camphene, and linalool.

8. In a method of tackifying an adhesive, the improvement comprising adding to the adhesive tackifying quantity of a copolymer consisting of the following monomer units:
   (A) 10 to 50% by weight of a terpene with an internal double bond and no conjugated double bonds,
   (B) 20 to 50% by weight of a member selected from the group consisting of acrylic acid, methacrylic acid, maleic acid and maleic anhydride, and
   (C) 40 to 50% by weight of an ester selected from the group consisting of acrylates, methacrylates, maleic acid semiesters and diesters, fumaric acid semiesters and diesters, itaconic acid esters, and crotonic acid esters.

9. The method claimed in claim 8 wherein said esters are esters of alcohols containing 6 to 22 carbon atoms.

10. The method claimed in claim 9 wherein said member of (B) is selected from the group consisting of maleic acid and maleic anhydride.

11. The method claimed in claim 10 wherein said terpene is selected from the group consisting of α-pinene, geraniol, nerol, citral, citronellal, limonene/dipentene, β-pinene, camphene, and linalool.

\* \* \* \* \*